(12) United States Patent
Baran et al.

(10) Patent No.: US 9,473,643 B2
(45) Date of Patent: Oct. 18, 2016

(54) MUTE DETECTOR

(71) Applicant: Intel Corporation, Santa Clara, CA (US)

(72) Inventors: Stanley J. Baran, El Dorado Hills, CA (US); Gokcen Cilingir, Santa Clara, CA (US)

(73) Assignee: INTEL Corporation, Santa Clara, CA (US)

( * ) Notice: Subject to any disclaimer, the term of this patent is extended or adjusted under 35 U.S.C. 154(b) by 11 days.

(21) Appl. No.: 14/574,501

(22) Filed: Dec. 18, 2014

(65) Prior Publication Data

US 2016/0182727 A1 Jun. 23, 2016

(51) Int. Cl.
*H04M 3/56* (2006.01)
*G10L 15/08* (2006.01)
*G08B 21/18* (2006.01)

(52) U.S. Cl.
CPC .............. *H04M 3/568* (2013.01); *G08B 21/18* (2013.01); *G10L 15/083* (2013.01)

(58) Field of Classification Search
CPC ..... H04M 3/568; G10L 15/083; G08B 21/18
See application file for complete search history.

(56) References Cited

U.S. PATENT DOCUMENTS 6,870,919 B2 *  3/2005  Dobler ................. H04M 1/247
                                                        379/163
7,848,511 B2 * 12/2010  Dresher .............. H04M 1/6033
                                                        379/421

OTHER PUBLICATIONS

Bimbot et al., A Tutorial on Text-Independent Speaker Verification, EURASIP Journal of Applied Signal Processing 2004: 4, 430-451, Hindawi Publishing Corporation, 22 pages.
Togneri et al., An Overview of Speaker Identification: Accuracy and Robustness Issues, IEEE Circuits and Systems Magazine, Second Quarter 2011, 1531-636X, 39 pages.

* cited by examiner

*Primary Examiner* — Kristy A Haupt
(74) *Attorney, Agent, or Firm* — Finch & Maloney PLLC

(57) ABSTRACT

A mute detector actively provides an indication to a user when the user is speaking while on mute in an audio conferencing application. The indication may prevent the user from speaking for a period without being heard by other participants. The indication also may prevent a user from believing they were heard by others in an audio conference when they were, in fact, on mute. The techniques may be integrated into the software layer of any audio or video conferencing application, although other implementations will be apparent in light of this disclosure.

25 Claims, 7 Drawing Sheets

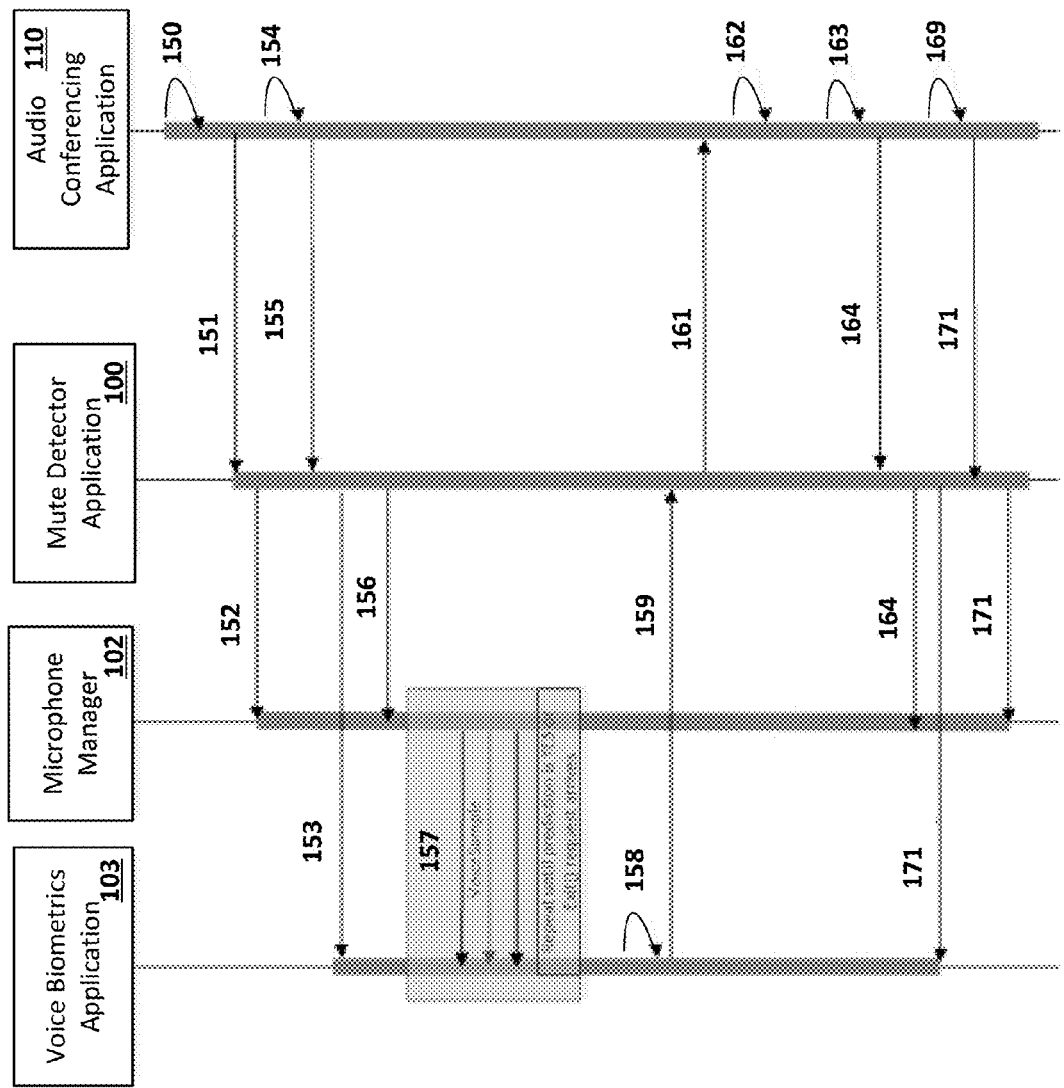

MUTE DETECTOR

BACKGROUND

Users often participate remotely in audio conferences or telephone calls without speaking for periods of time. In such circumstances, a user may place themselves on mute to prevent other audio conference participants from hearing background noise that emanates from the user's location. The user may, however, forget to unmute their audio feed and begin speaking to other audio conference participants without being heard. Users may not recognize that they are speaking while on mute for some time. Alternately, users may not later realize that they were speaking to audio conference participants while on mute, leaving the user with the impression that other participants heard what the user had to say.

BRIEF DESCRIPTION OF THE DRAWINGS

FIG. 6 shows an alternate view of information flow between an audio conferencing application, a mute detector, a microphone manager, and a voice biometrics application in accordance with example embodiments of the present disclosure.

DETAILED DESCRIPTION

Techniques disclosed herein actively provide an indication to a user when the user is speaking while on mute in an audio or video conferencing application. Such an indication may be beneficial, for example, in preventing the user from speaking for a period without being heard by other participants. The indication may also prevent a user from believing they were heard by others in an audio conference when they were, in fact, on mute. The techniques can be integrated, for example, in the software layer of any audio or video conferencing application, and in operation can detect a user speaking while on mute in a relatively short period of time (e.g., a few seconds). The user can thus be informed and take corrective action (turn off mute).

In an embodiment, the techniques allow the conferencing system to reliably detect when a user is speaking in an office or home or other environment with other people or sources actively making noise. Thus, mute indications are generated when the user speaks while on mute, rather than when other human voice or noise activity is detected, thereby avoiding false indications. To this end, such an embodiment is able to distinguish the voice of a user from other human voices or noise activity and may provide an indication to a user within 3 seconds or less, for example. In one particular embodiment, the techniques are implemented as a mute detection module that is programmed or otherwise configured to receive and monitor an incoming audio stream from a microphone of a user participating in an audio conference. Voice biometrics may be used to establish a voice print for the user for use in analyzing the audio stream to determine whether the user is speaking. An enrollment procedure may be used to produce the voice print for the user (or users, as the case may be). Threshold values may be set to different values to prevent false conclusions in determining when the user is speaking. Interfaces with audio or video conferencing applications may be made through application programming interfaces (APIs) available with any such conferencing applications. Mute detectors, according to some example embodiments, may send and/or receive indicators or other messages to the user and any audio/video conferencing application in use by the user through such interfaces. As will be appreciated, while the techniques are particular suited to audio conferencing applications, they can readily be adapted to the audio portion of video conferencing applications, as will be appreciate in light of this disclosure. For purposes of simplicity, the present disclosure is presented in the context of audio conferencing applications.

Figure 1:
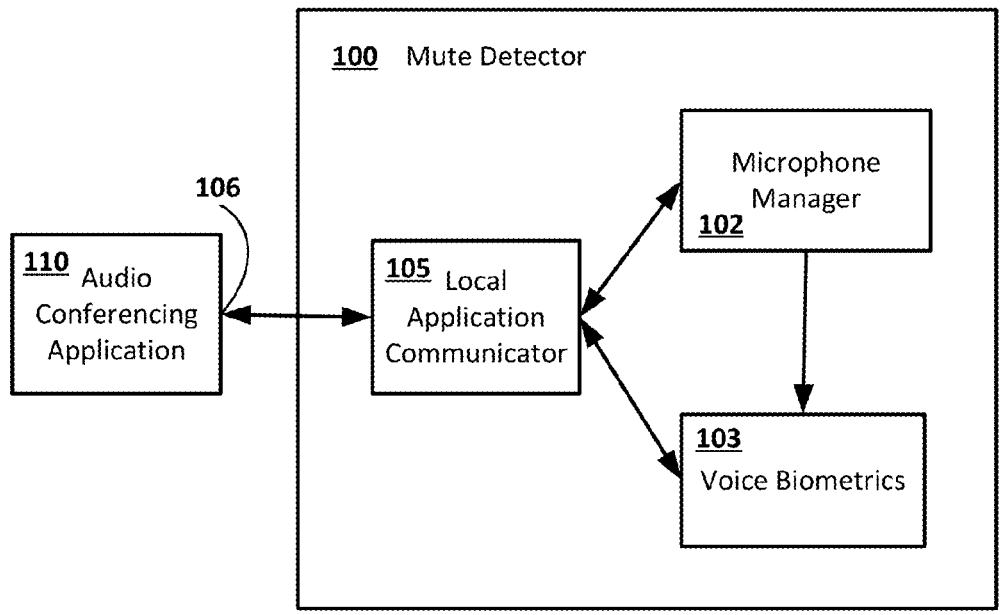
FIG. 1 shows a mute detector interface with an audio conferencing application in accordance with an example embodiment of the present disclosure.

Turn now to the Figures and initially FIG. 1 that shows an example embodiment of a mute detector 100 interfaced with an audio conferencing application 110. The mute detector 100 has various optional subcomponents, including a microphone manager 102, voice biometrics 103, and a local application communicator 105. An application programming interface 106 provides a communication portal between the audio conferencing application and the mute detector 100 and over which a user voice audio stream, an audio conference audio stream, and/or other information may be exchanged.

Figure 2:
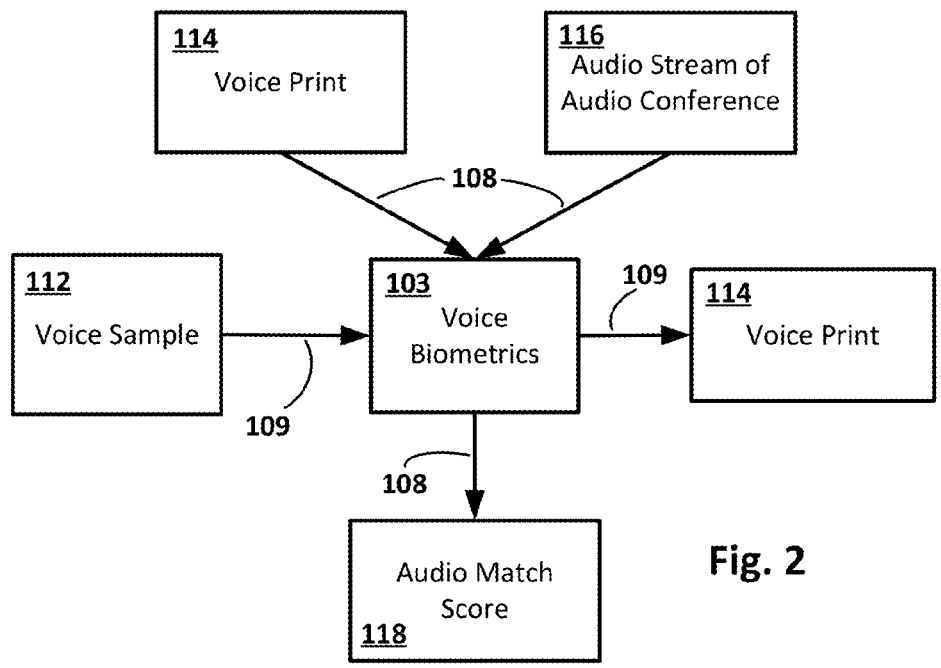
FIG. 2 shows information flows for a user voice matching process and a user voice enrollment process in accordance with an example embodiment of the present disclosure.

In FIG. 2, information flows for a user voice matching process 108 and a user voice enrollment process 109 are shown. User voice enrollment includes passing a user voice sample to a voice biometrics application 103 that produces a voice print 114 for the user. The voice print 114 may subsequently be used as part of the user voice matching process 108.

As part of the voice matching process 108 shown in FIG. 2, voice print 114 is passed to the voice biometrics application 103 along with a user audio stream of the audio conference 116. The user audio stream 116 includes audio received from a microphone of the user that may be passed to the audio conferencing application when a user mute is deactivated and that will not be passed to the audio conferencing application when the user mute is activated. The user audio stream may also include ambient noise from the user's location. The voice biometrics application 103 analyzes the user audio stream of the audio conference 116 in view of the user voice print 114 to determine an audio match score 118.

Figure 3:
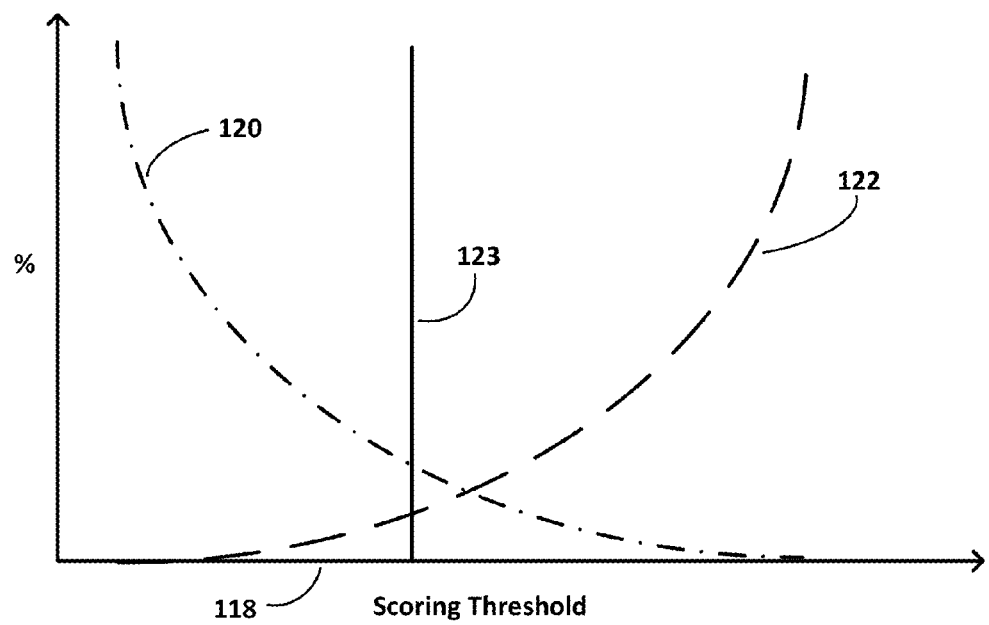
FIG. 3 shows a graphical representation of a match score value relative to error rate probabilities for a range of scoring threshold values in accordance with an example embodiment of the present disclosure.

Match scores 118 may be compared with a threshold match values 123 to determine whether a user is speaking, such as when match value is exceeded, as determined by a voice biometrics application. FIG. 3 provides a graphical representation of a match score value 123 relative to error rate probabilities 120, 122 for range of scoring threshold values 118. The determination as to whether the user is speaking may include a binary yes or no response. The response may, additionally or alternatively, be accompanied by a percentage or probability of an associated false acceptance 120 or false rejection 122 of the user's voice.

A threshold match value 123 that is set relatively high along a scoring threshold 118 may have a relatively low false accept error rate, as may be gleaned from the false accept error rate curve 120 shown in FIG. 3. In such scenarios, false accept error rates will be low, meaning it may be difficult for a noise source or human speech, other than that of the user, to be mistaken as the voice of the user when the user is in fact not speaking. A relatively high threshold value may, however, relate to a relatively high false reject error rate 122, as may also be gleaned from FIG. 3. False reject errors occur when a voice biometrics solution fails to detect that a user is speaking when, in fact, the user is speaking. According to some example embodiments, threshold match values 123 may be set by the user to achieve desired false accept error rates or false reject error rates.

The term "voice biometrics", as used herein, refers to a mechanism for identifying of a voice of a particular person by comparing characteristics of a spoken voice to that of a voice print associated with the speaker. A voice print for use by a voice biometrics solution may be established when a user is speaking a pre-determined enrollment phrase, according to some example embodiments. Applications that also utilize the pre-determined phrase during matching may be referred to as text dependent voice biometric applications. According to other example embodiments, voice prints may be established when a user is speaking freely. Such applications may be referred to as free speech or text independent voice biometric applications. Examples of the types of voice characteristics and techniques that voice biometrics applications use to identify a speaker may include frequency estimation, hidden Markov models, Gaussian mixture models, pattern matching algorithms, neural networks, matrix representation, vector quantization and decision trees.

Enrollment time, as used herein, refers to an amount of time used by a voice biometrics application to establish a voice print from a user voice sample. Enrollment times, according to some embodiments, may be under a minute, under 45 seconds, under 30 seconds, and under 15 seconds. Whether a voice biometrics application is a text dependent or text independent may impact enrollment time.

Mute detectors may take various different actions when a user is determined to be speaking while mute is on. According to some example embodiments, an indicator is activated to alert the user that mute is on. Indicators may be audible, visual, or combinations thereof. According to some example embodiments, a pop up screen is activated on a user interface of a computing device that hosts the audio conferencing application. Additionally or alternatively, a tone or voice is activated on a speaker that plays audio from the audio conference for the user.

Example embodiments may include an auto unmute function that unmutes the user when the user is determined to be speaking. A user may be warned, such as by an audible and/or visible indicator, prior to or contemporaneously with unmuting by the auto unmute function. According to some example embodiments, auto-unmute is a feature that may be turned off and on, as desired by a user. Auto unmute is to be considered an indicator, as the term "indicator" is used herein, regardless as to whether auto unmute is accompanied by another audible or visual indication that is provided to a user.

Figure 4:
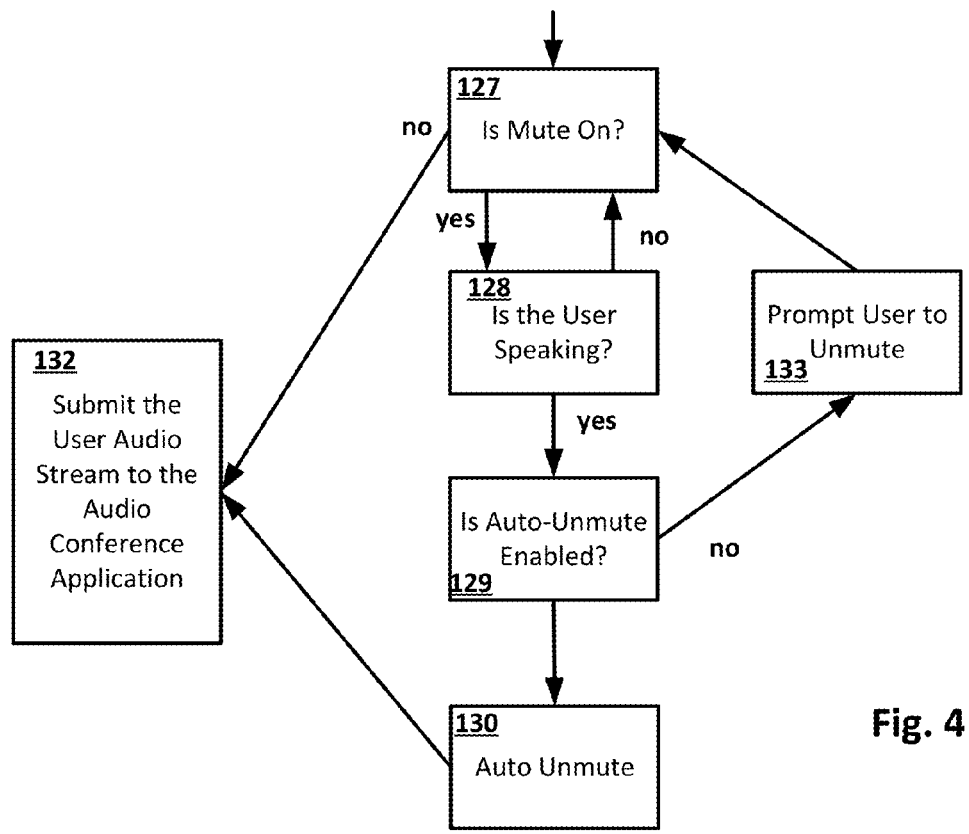
FIG. 4 is a flow chart that illustrates functional operation of various features of a mute detector in accordance with example embodiments of the present disclosure.

FIG. 4 is a flow chart that illustrates functional operation of a mute detector, according to an example embodiment. As shown, a logical function determines if mute is on 127. If mute is not on, the audio stream 125 is submitted to the audio conference application 132. If mute is determined to be on, the audio stream is assessed to determine if the user is speaking 128. A logical function determines if an auto unmute function is active 129 and if so, automatically unmutes the user and passes the audio stream to the audio conferencing application 132. If auto unmute is not enabled, an indicator is provided to the user to prompt the user to turn mute off 133.

Figure 5:
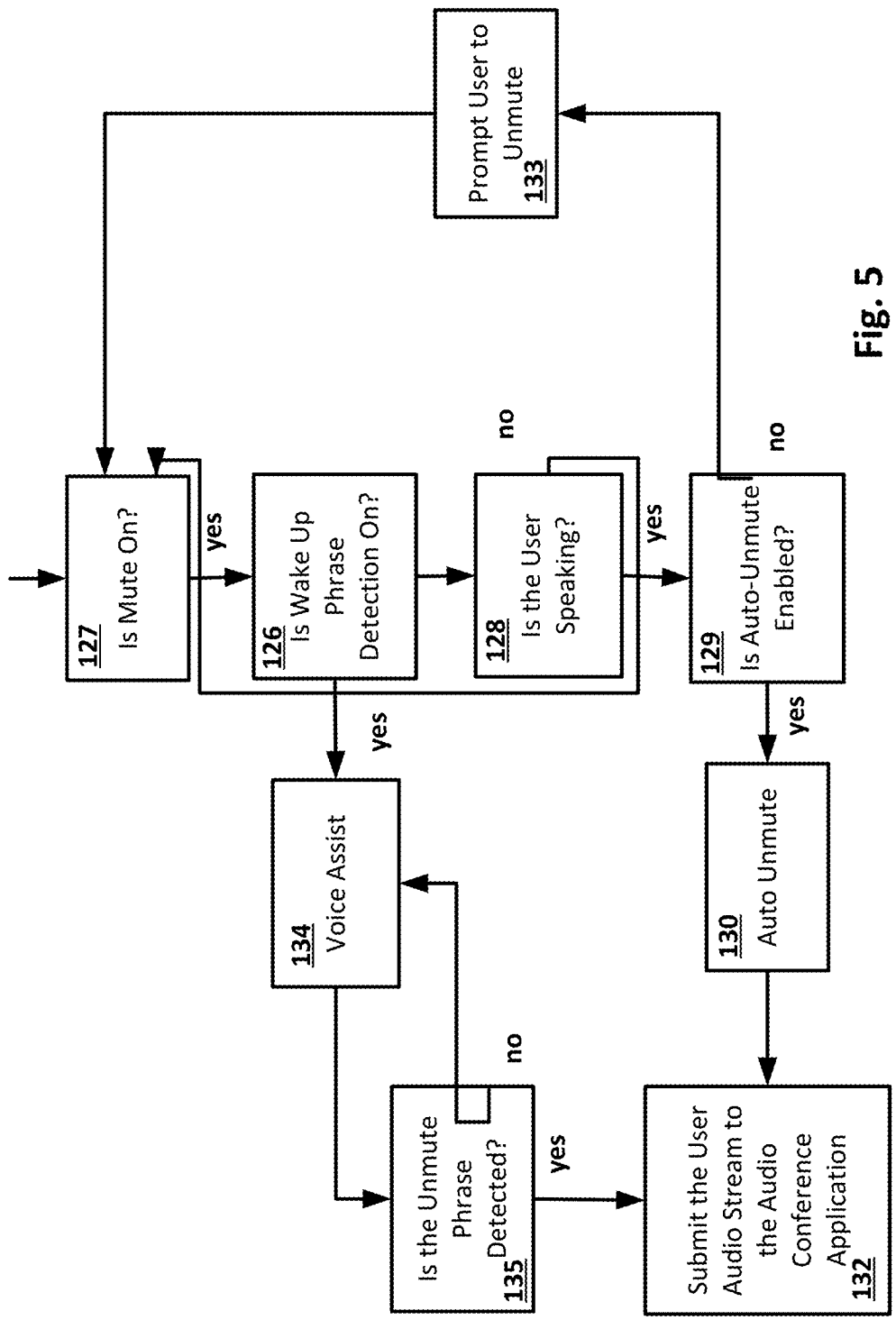
FIG. 5 is a flow chart that illustrates functional operation of various features of a mute detector in accordance with example embodiments of the present disclosure.

According to some example embodiments, a voice assist function may help a user turn mute off and/or determine if mute is on. Voice assist may include a wake up phrase or tone that is activated according to a schedule when the user is on mute. The wake up phrase may serve to remind the user that mute is active. A voice assist function may, additionally or alternatively include one or more unmute phrases that are recognized by a voice biometrics application when spoken by a user, causing mute to turn off. In this respect, hands free operation of unmuting may be enabled for a user. FIG. 5 shows the flow chart of FIG. 4, including wake up phrase detection 126 and voice assist 134 that capable of turning mute off when an unmute phrase is detected 135.

FIG. 6 shows an alternate view of information flows between the audio conferencing application 110, the mute detector 100, the microphone manager 102 and the voice biometrics application. When the audio conference is started 150, initialization processes 151, 152, 153 are begun for the mute detector 100, the microphone manager 102, and the voice biometrics application 103. Once a user turns mute on 154, the mute detector 100 listens to the audio conferencing application 110. The mute detector 100 also starts streaming audio information 156 to the microphone manager 102. The voice biometrics application and the microphone manager assess the audio stream in view of a voice print, continuing this assessment until either a match between the audio stream and voice print is determined or instructions are received to stop assessing. If a match is detected 158, the mute detector is informed and a match score is provided 159 to the mute detector 100. The match score may also be provided 161 to the audio conferencing application 110 and to the mute detector 100 with a match score. The audio conferencing application 110 utilizes the match score to determine whether to provide an indicator to the user that mute is active and/or to automatically unmute the user, depending on user preferences. Mute may be turned off 163, at which time audio stream may no longer be provided 164 to the mute detector 100 or components of the mute detector, including the voice biometrics application 103 and microphone manager 102. Once the audio conference ends 169, instructed are provided to exit 171 each of the mute detector 100, the microphone manager 102, and voice biometrics application 103.

Experimental Results

Figure 7A:
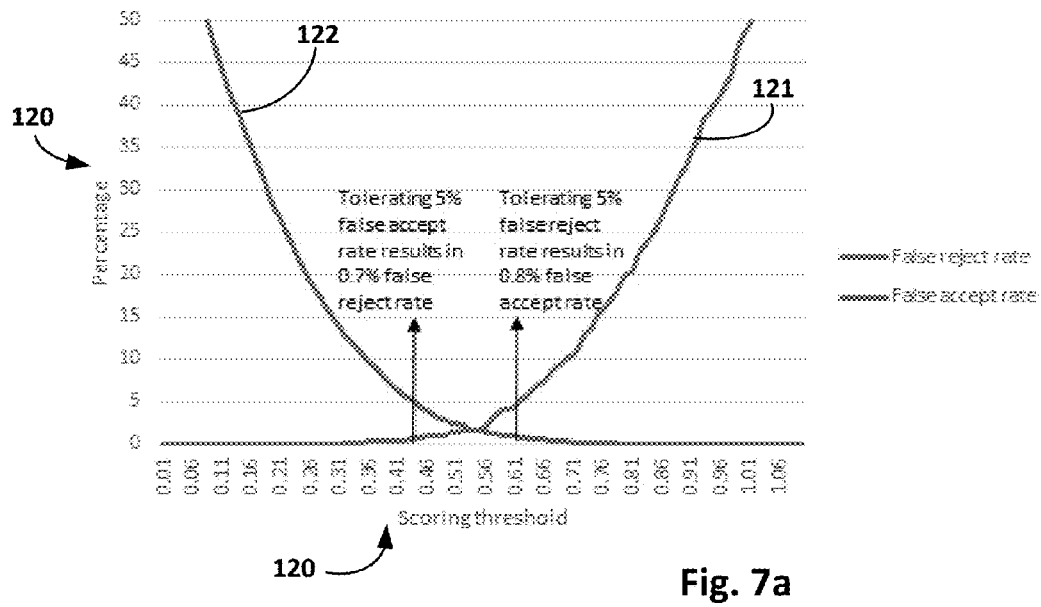
FIGS. 7a and 7b show plots for experiments conducted to illustrate false accept rates and false reject rates of voice biometrics applications in accordance with example embodiments of the present disclosure.

FIG. 7a shows a plot of experimental false accept rates 121 and false reject rates 122 of a voice biometrics application with enrollment having occurred in a free speech mode. A 12 speaker gender balanced dataset was used for the evaluation with both enrollment and test clips recorded with a headset and with no background noise present. Test clips were post processed to digitally add moderate office noise (15 db SNR). Enrollment time was set to 40 seconds and a verification time was set to 3 seconds. The illustrated false reject rates 121 and false accept rates 122 reflect averages over 12 speakers. In this context, false reject rates reflect not detecting an "on mute talking event", while the target speaker is talking. Similarly, false accept rates reflect where false detection occurs for the "on mute talking event", while the target speaker is not talking, but another speaker is talking. For higher scoring threshold values, false reject rates increased and false accept rate decreased steadily. At 5% target false accept rate, the false reject rate of the system was 0.7%. At 5% target false reject rate, false accept rate of the system were 0.8%.

Figure 7B:
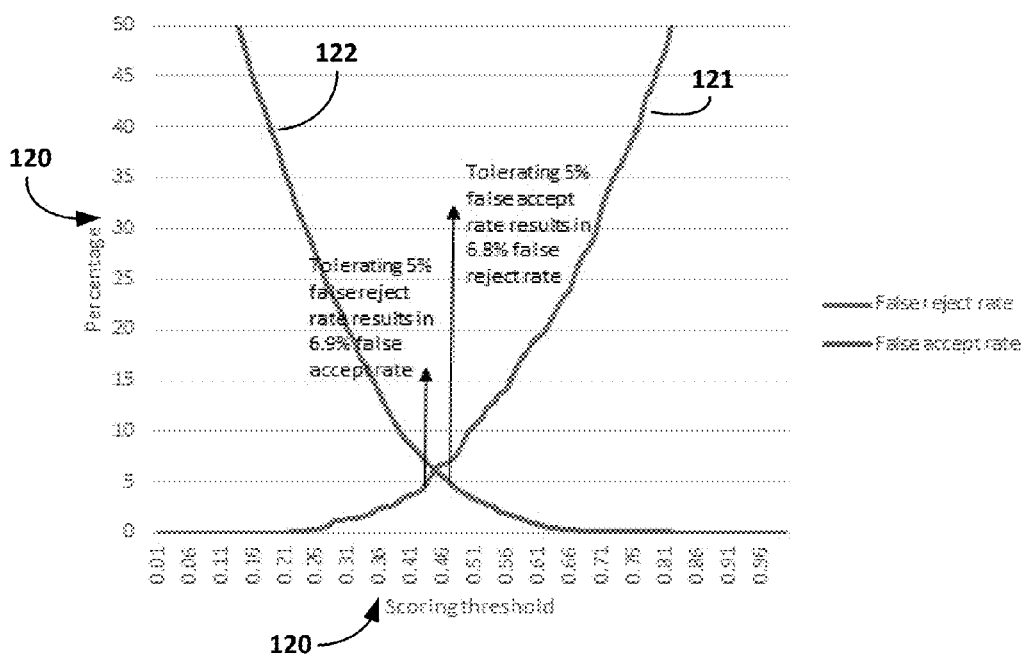

Tests were also conducted on an example embodiment of a mute detector where moderate babble noise (15 db SNR) was digitally mixed with a test clips and with a voice print that was representative of a quality associated with a voice sample recorded in a quiet environment. FIG. 7b is a graph that shows false accept rate 121 and false reject rates 122 of a similar voice biometrics application in free speech mode using the same dataset for evaluation. At 5% target false accept rate, the false reject rate of the system was 6.8%. At 5% target false reject rate, false accept rate of the system was 6.9%. These results were representative of a difficult real life scenario, since babble noise is a type of background noise known to degrade voice biometric application performance.

Example System

Figure 8:
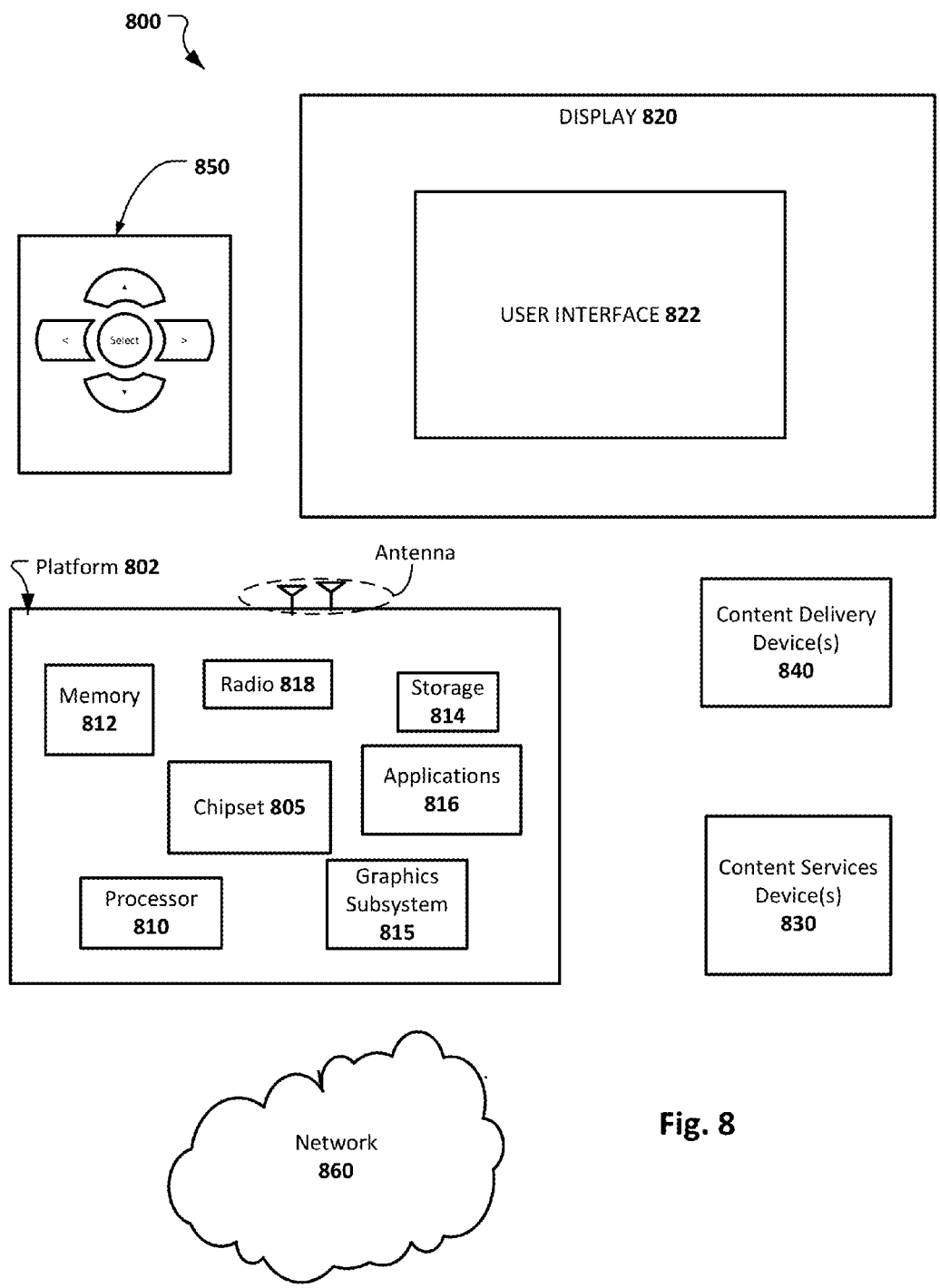
FIG. 8 shows a media system configured in accordance with an embodiment of the present disclosure.

FIG. 8 illustrates a system 800 configured in accordance with an embodiment of the present disclosure. In some embodiments, system 800 may be a system for showing still or moving images, such as maybe associated with an audio conference, although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 800 comprises a platform 802 coupled to a display 820. Platform 802 may receive content from a content device such as content services device(s) 830 or content delivery device(s) 640 or other similar content sources. A navigation controller 850 comprising one or more navigation features may be used to interact with, for example, platform 802 and/or display 820, so as to supplement navigational gesturing by the user. Each of these example components is described in more detail below.

In some embodiments, platform 802 may comprise any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 810 may comprise dual-core processor(s), dual-core mobile processor(s), and so forth. Memory 812 may be implemented, for instance, as a volatile memory device such as, but not limited to, a Random Access Memory (RAM), Dynamic Random Access Memory (DRAM), or Static RAM (SRAM). Storage 814 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 814 may comprise technology to increase the storage performance enhanced protection for valuable digital media when multiple hard drives are included, for example.

Graphics subsystem 815 may perform processing of images such as still or video images for display, and in some embodiments is configured to provide visual indicators for a mute detector, as variously described herein. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805. The graphics and/or video processing techniques, including the techniques for providing mute indicators described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In some embodiments, content services device(s) 830 may be hosted by any national, international and/or independent service and thus accessible to platform 802 via the Internet or other network, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820. In some embodiments, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, graphics, text, medical and gaming content, and so forth.

Content services device(s) 830 receives content such as cable television programming including media information, digital information, and/or other content. Examples of content providers may include any cable or satellite television or radio or Internet content providers. The provided examples are not meant to limit the present disclosure. In some embodiments, platform 802 may receive control signals from navigation controller 850 having one or more navigation features. The navigation features of controller 850 may be used to interact with user interface 822, for example. In some embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 850 may be echoed on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In some embodiments, controller 850 may not be a separate component but integrated into platform 802 and/or display 820. Embodiments, however, are not limited to the elements or in the context shown or described herein, as will be appreciated.

In some embodiments, drivers (not shown) may comprise technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 when the platform is turned "off." In addition, chipset 805 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., face images, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 8.

Figure 9:
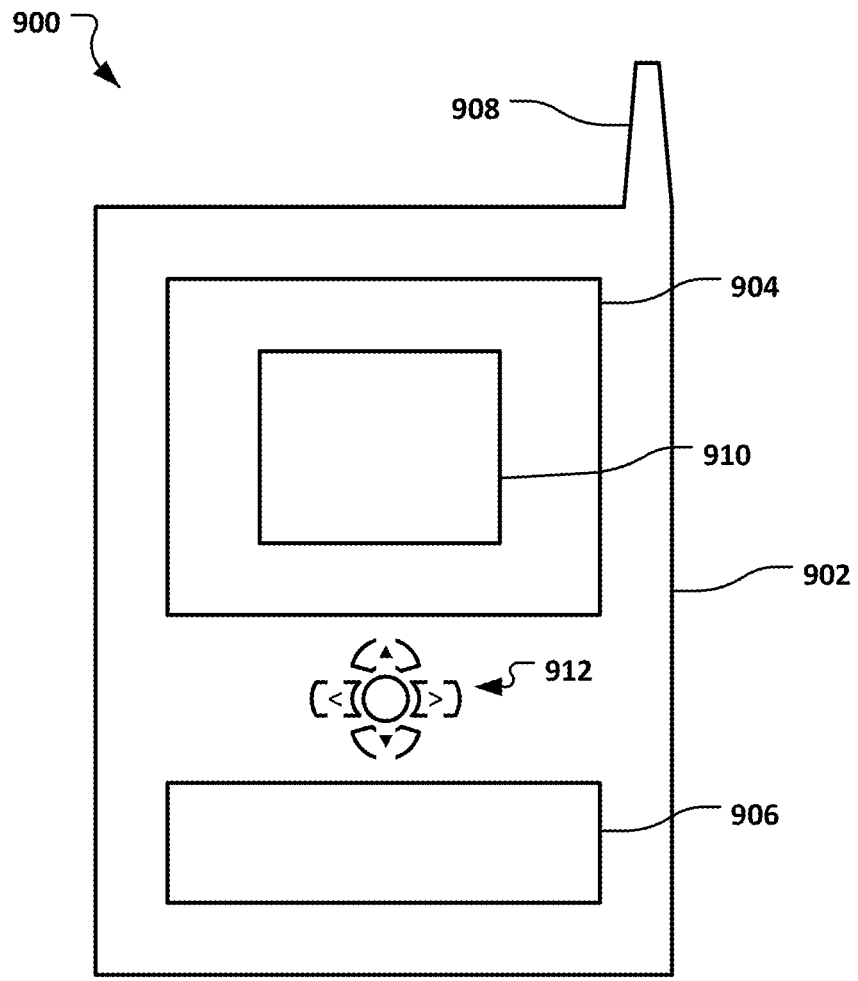
FIG. 9 shows a mobile computing system configured in accordance with an embodiment of the present disclosure.

As described above, system 800 may be embodied in varying physical styles or form factors. FIG. 9 illustrates embodiments of a small form factor device 900 in which system 800 may be embodied. In some embodiments, for example, device 900 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, armband computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, mobile electronic device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device, which in one example embodiment is a touchscreen display. I/O device 906 may comprise any suitable I/O device for entering information into a mobile computing device. Examples for I/O device 906 may include an alphanumeric keyboard, a numeric keypad, a touch pad, input keys, buttons, a camera, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is a computer program product comprising one or more non-transient computer-readable mediums having encoded thereon executable instructions that, when execute by at least one processor, cause the at least one processor to carry out a process for indicating a mute status to a user in an audio conference. The process includes establishing a user voice print; identifying a positive mute status for the user in the audio conference; assessing an audio stream of the audio conference to identify an audio match with the user voice print; and providing an indicator to the user when the positive mute status and the audio match with the user voice print are identified.

Example 2 includes the subject matter of example 1, and further includes assessing the audio stream includes establishing a match threshold and wherein identifying the audio match includes determining an audio match score for the audio stream, the indicator provided when the audio match score exceeds the match threshold.

Example 3 includes the subject matter of example 2, and further includes where establishing the match threshold includes establishing the match threshold with respect to a target false positive audio match rate.

Example 4 includes the subject matter of any of examples 2-3, and further includes establishing the match threshold includes establishing the match threshold with respect to a target false negative audio match arte.

Example 5 includes the subject matter of any of examples 1-4, and further includes providing the indicator includes providing an audible indicator to the user.

Example 6 includes the subject matter of any of examples 1-5, and further includes providing the indicator includes providing a visual indicator to the user.

Example 7 includes the subject matter of any of examples 1-6, and further includes establishing the user voice print includes receiving a voice sample from the user and enrolling the voice sample with voice biometrics to establish the user voice print.

Example 8 includes the subject matter of example 7, where enrollment occurs in less than one minute.

Example 9 includes the subject matter of any of examples 7-8, and further includes receiving the voice sample includes a predetermined phrase.

Example 10 includes the subject matter of any of examples 1-9, and further includes unmuting the user in the audio conference after identifying the audio match with the user voice print.

Example 11 includes the subject matter of example 10, and further includes unmuting the user occurs automatically after identifying the audio match with the user voice print.

Example 12 includes the subject matter of example 10, and further includes where the user is prompted by the indicator for input prior to unmuting the user in the audio conference.

Example 13 includes the subject matter of any of examples 1-9, where the process further includes identifying an unmute phrase spoken by the user; and unmuting the user in the audio conference upon identifying the unmute phrase.

Example 14 is a system that includes a microphone; one or more processors; and a memory having encoded thereon executable instructions that, when executed by the one or more processors, cause the one or more processors to carry out a process for indicating a mute status to a user in an audio conference. The process includes establishing a user voice print; identifying a positive mute status for the user in the audio conference; assessing an audio stream of the audio conference received from the microphone to identify an audio match with the user voice print; and providing an indicator to the user when the positive mute status and the audio match with the user voice print are identified.

Example 15 includes the subject matter of example 14, and further includes assessing the audio stream includes establishing a match threshold and wherein identifying the audio match includes determining an audio match score for the audio stream, the indicator provided when the audio match score exceeds the match threshold.

Example 16 includes the subject matter of example 15, and further includes establishing the match threshold includes establishing the match threshold with respect to a false positive audio match.

Example 17 includes the subject matter of any of examples 15-16, and further includes establishing the match threshold includes establishing the match threshold with respect to a false negative audio match.

Example 18 includes the subject matter of any of examples 15-17, and further includes providing the indicator includes providing an audible indicator to the user.

Example 19 includes the subject matter of any of examples 14-18, and further includes providing the indicator includes providing a visual indicator to the user.

Example 20 includes the subject matter of any of examples 14-19, and further includes establishing the user voice print includes receiving a voice sample from the user and enrolling the voice sample with voice biometrics to establish the user voice print.

Example 21 includes the subject matter of example 20, where enrollment occurs in less than one minute.

Example 22 includes the subject matter of any of examples 20-21, and further includes receiving the voice sample includes a predetermined phrase.

Example 23 includes the subject matter of any of examples 14-22, where the process further includes unmuting the user in the audio conference after identifying the audio match with the user voice print.

Example 24 includes the subject matter of example 23, and further includes unmuting the user occurs automatically after identifying the audio match with the user voice print.

Example 25 includes the subject matter of example 23, and further includes the user is prompted by the indicator for input prior to unmuting the user in the audio conference.

Example 26 includes the subject matter of any of examples 14-22, where the process further includes identifying an unmute phrase spoken by the user; and unmuting the user in the audio conference upon identifying the unmute phrase.

Example 27 is a method for indicating a mute status to a user in an audio conference. The method includes establishing a user voice print; identifying a positive mute status for the user in the audio conference; assessing an audio stream of the audio conference to identify an audio match with the user voice print; and providing an indicator to the user when the positive mute status and the audio match with the user voice print are identified.

Example 28 includes the subject matter of example 27, and further includes assessing the audio stream includes establishing a match threshold and wherein identifying the audio match includes determining an audio match score for the audio stream, the indicator provided when the audio match score exceeds the match threshold.

Example 29 includes the subject matter of example 28, and further includes establishing the match threshold includes establishing the match threshold with respect to a false positive audio match.

Example 30 includes the subject matter of any of examples 28-29, and further includes establishing the match threshold includes establishing the match threshold with respect to a false negative audio match.

Example 31 includes the subject matter of any of examples 27-30, and further includes providing the indicator includes providing an audible indicator to the user.

Example 32 includes the subject matter of any of examples 27-31, and further includes providing the indicator includes providing a visual indicator to the user.

Example 33 includes the subject matter of any of examples 27-32, and further includes establishing the user voice print includes receiving a voice sample from the user and enrolling the voice sample with voice biometrics to establish the user voice print.

Example 34 includes the subject matter of example 33, where enrollment occurs in less than one minute.

Example 35 includes the subject matter of any of examples 33-34, and further includes receiving the voice sample includes a predetermined phrase.

Example 36 includes the subject matter of any of examples 27-35, and further includes unmuting the user in the audio conference after identifying the audio match with the user voice print.

Example 37 includes the subject matter of example 36, and further includes unmuting the user occurs automatically after identifying the audio match with the user voice print.

Example 38 includes the subject matter of example 36, and further includes where the user is prompted by the indicator for input prior to unmuting the user in the audio conference.

Example 39 includes the subject matter of any of examples 27-35, and further includes identifying an unmute phrase spoken by the user; and unmuting the user in the audio conference upon identifying the unmute phrase.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer program product comprising one or more non-transient computer-readable mediums having encoded thereon executable instructions that, when executed by at least one processor, cause the at least one processor to carry out a process for indicating a mute status to a user in an audio conference, the process comprising:
    establishing a user voice print;
    identifying a positive mute status for the user in the audio conference;
    assessing an audio stream of the audio conference to identify an audio match with the user voice print based on a comparison between an audio match score for the audio stream and a match threshold configurable by the user to control at least one of a false positive audio match rate and a false negative audio match rate; and
    providing an indicator to the user when the positive mute status and the audio match with the user voice print are identified.

2. The computer program product of claim 1, wherein identifying the audio match includes determining the audio match score for the audio stream, the indicator provided when the audio match score exceeds the match threshold.

3. The computer program product of claim 2, wherein the match threshold is set with respect to the false positive audio match rate.

4. The computer program product of claim 3, wherein the match threshold is set with respect to the false negative audio match rate.

5. The computer program product of claim 1, wherein providing the indicator includes providing an audible indicator to the user.

6. The computer program product of claim 1, wherein providing the indicator includes providing a visual indicator to the user.

7. The computer program product of claim 1, wherein establishing the user voice print includes receiving a voice sample from the user and enrolling the voice sample with voice biometrics to establish the user voice print.

8. The computer program product of claim 1, the process further comprising:
   unmuting the user in the audio conference after identifying the audio match with the user voice print.

9. A system, comprising:
   a microphone;
   one or more processors; and
   a memory having encoded thereon executable instructions that, when executed by the one or more processors, cause the one or more processors to carry out a process for indicating a mute status to a user in an audio conference, the process including:
   establishing a user voice print;
   identifying a positive mute status for the user in the audio conference;
   assessing an audio stream of the audio conference received from the microphone to identify an audio match with the user voice print based on a comparison between an audio match score for the audio stream and a match threshold configurable by the user to control at least one of a false positive audio match rate and a false negative audio match rate; and
   providing an indicator to the user when the positive mute status and the audio match with the user voice print are identified.

10. The system of claim 9, wherein identifying the audio match includes determining the audio match score for the audio stream, the indicator provided when the audio match score exceeds the match threshold.

11. The system of claim 10, wherein the match threshold is set with respect to the false positive audio match rate.

12. The system of claim 11, wherein the match threshold is set with respect to the false negative audio match rate.

13. The system of claim 12, wherein establishing the user voice print includes receiving a voice sample from the user and enrolling the voice sample with voice biometrics to establish the user voice print.

14. The system of claim 13, wherein enrollment occurs in less than one minute.

15. The system of claim 9, the process further comprising:
   unmuting the user in the audio conference after identifying the audio match with the user voice print.

16. The system of claim 15, wherein unmuting the user occurs automatically after identifying the audio match with the user voice print.

17. The system of claim 15, wherein the user is prompted by the indicator for input prior to unmuting the user in the audio conference.

18. The system of claim 9, the process further comprising:
   identifying an unmute phrase spoken by the user; and
   unmuting the user in the audio conference upon identifying the unmute phrase.

19. A method for indicating a mute status to a user in an audio conference, the method comprising:
   establishing a user voice print;
   identifying a positive mute status for the user in the audio conference;
   assessing an audio stream of the audio conference to identify an audio match with the user voice print based on a comparison between an audio match score for the audio stream and a match threshold configurable by the user to control at least one of a false positive audio match rate and a false negative audio match rate; and
   providing an indicator to the user when the positive mute status and the audio match with the user voice print are identified.

20. The method of claim 19, wherein identifying the audio match includes determining the audio match score for the audio stream, the indicator provided when the audio match score exceeds the match threshold.

21. The method of claim 20, wherein the match threshold is set with respect to the false positive audio match rate.

22. The method of claim 20, wherein the match threshold with respect to the false negative audio match rate.

23. The method of claim 19, wherein establishing the user voice print includes receiving a voice sample from the user and enrolling the voice sample with voice biometrics to establish the user voice print.

24. The method of claim 23, wherein enrollment occurs in less than one minute.

25. The method of claim 19, further comprising:
   unmuting the user in the audio conference after identifying the audio match with the user voice print.

* * * * *